US012800205B2

(12) United States Patent
Vestergaard et al.

(10) Patent No.: US 12,800,205 B2
(45) Date of Patent: Nov. 17, 2026

(54) COOLING SYSTEM FOR EFFICIENT OPERATION

(71) Applicant: Danfoss A/S, Nordborg (DK)

(72) Inventors: Niels P. Vestergaard, Nordborg (DK); Johan Van Beek, Nordborg (DK)

(73) Assignee: DANFOSS A/S, Nordborg (DK)

( * ) Notice: Subject to any disclaimer, the term of this patent is extended or adjusted under 35 U.S.C. 154(b) by 1396 days.

(21) Appl. No.: 17/297,596

(22) PCT Filed: Nov. 25, 2019

(86) PCT No.: PCT/EP2019/082380
§ 371 (c)(1),
(2) Date: May 27, 2021

(87) PCT Pub. No.: WO2020/109213
PCT Pub. Date: Jun. 4, 2020

(65) Prior Publication Data
US 2022/0026127 A1 Jan. 27, 2022

(30) Foreign Application Priority Data
Nov. 29, 2018 (EP) .................................... 18209030

(51) Int. Cl.
*F25B 49/02* (2006.01)
*F25B 43/00* (2006.01)
*G01K 1/143* (2021.01)

(52) U.S. Cl.
CPC ............ *F25B 49/02* (2013.01); *F25B 43/006* (2013.01); *F25B 2400/051* (2013.01); (Continued)

(58) Field of Classification Search
CPC .................... F25B 49/02; F25B 49/005; F25B 2600/2515; G01K 1/143
See application file for complete search history.

(56) References Cited

U.S. PATENT DOCUMENTS 3,735,603 A 5/1973 Hamilton
4,123,919 A 11/1978 Fehlhaber
(Continued)

FOREIGN PATENT DOCUMENTS

CA 2862159 C 11/2016
CN 101029737 A 9/2007
(Continued)

OTHER PUBLICATIONS

International Search Report for Application No. PCT/EP2019/082380 dated Feb. 20, 2020.
(Continued)

*Primary Examiner* — Frantz F Jules
*Assistant Examiner* — Webeshet Mengesha
(74) *Attorney, Agent, or Firm* — McCormick, Paulding & Huber PLLC

(57) ABSTRACT

The invention relates to a cooling system and operating method therefor with a direct expansion cooling circuit for an ammonia refrigerant. A compressor 12 is provided to compress ammonia vapor 11. A condenser is provided to condense the ammonia vapor to obtain liquid ammonia 20. An evaporator 32 is provided to evaporate the liquid ammonia. A superheat vapor quality sensor 40 is arranged at a conduit 34 between at least a portion of the evaporator 32 and the compressor 12. The superheat vapor quality sensor 40 comprises a heating element 48 and a temperature sensing element 52. The superheat vapor quality sensor 40 is disposed to deliver a sensor signal S indicative of a superheat vapor quality X of refrigerant flowing through the conduit 34 from an output of the temperature sensing element 52. The superheat vapor quality sensor 40 is arranged on a wall of a horizontally arranged portion of the conduit 34 in a position forming an angle of more than 120° to a vertical upward direction.

18 Claims, 7 Drawing Sheets

(52) U.S. Cl.
CPC ... *F25B 2600/21* (2013.01); *F25B 2600/2515* (2013.01); *G01K 1/143* (2013.01)

(56) References Cited

U.S. PATENT DOCUMENTS

| | | | |
|---|---|---|---|
| 4,167,858 A | 9/1979 | Kojima et al. | |
| 4,586,828 A * | 5/1986 | Winter | G01K 1/143 374/E1.019 |
| 4,835,976 A | 6/1989 | Torrence | |
| 5,195,331 A | 3/1993 | Zimmern et al. | |
| 5,289,692 A | 3/1994 | Campbell et al. | |
| 5,454,641 A | 10/1995 | Parker et al. | |
| 5,495,720 A | 3/1996 | Buck | |
| 5,691,466 A | 11/1997 | Lawrence et al. | |
| 6,079,220 A | 6/2000 | Buck | |
| 8,646,286 B2 | 2/2014 | Scherer et al. | |
| 9,874,385 B2 | 1/2018 | Izadi-Zamanabadi et al. | |
| 2006/0090490 A1* | 5/2006 | Grimm | B60H 1/00792 374/E1.019 |
| 2006/0165154 A1* | 7/2006 | Usui | G01K 1/14 374/E1.001 |
| 2010/0162810 A1* | 7/2010 | Hasebe | G01F 1/6847 73/204.26 |
| 2011/0209494 A1* | 9/2011 | Nelson | F28F 13/187 62/434 |
| 2013/0086930 A1 | 4/2013 | Scherer et al. | |
| 2015/0226472 A1 | 8/2015 | Scherer | |
| 2016/0178243 A1 | 6/2016 | Derosier | |
| 2016/0178257 A1 | 6/2016 | Liebendorfer et al. | |

FOREIGN PATENT DOCUMENTS

| | | |
|---|---|---|
| CN | 101124436 A | 2/2008 |
| CN | 101285572 A | 10/2008 |
| CN | 101516563 A | 8/2009 |
| CN | 203097835 U | 7/2013 |
| CN | 107257923 A | 10/2017 |
| CN | 113056644 A | 6/2021 |
| DE | 1055018 B | 4/1959 |
| DE | 3934801 A1 | 4/1991 |
| DE | 4115693 A1 | 11/1992 |
| EP | 0680589 A1 | 11/1995 |
| EP | 0954731 A1 | 11/1999 |
| EP | 1744113 A1 | 1/2007 |
| GB | 2157447 A | 10/1985 |
| GB | 8509184 A | 10/1985 |
| JP | 5878050 A | 5/1983 |
| WO | 9822762 A1 | 5/1998 |

OTHER PUBLICATIONS

First Examination Report for Indian Patent Application No. 202117011391 dated Aug. 9, 2021.

* cited by examiner

Fig. 3a
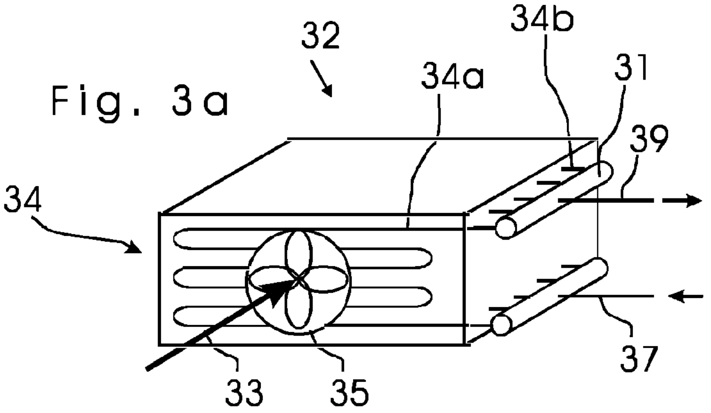
Fig. 3b
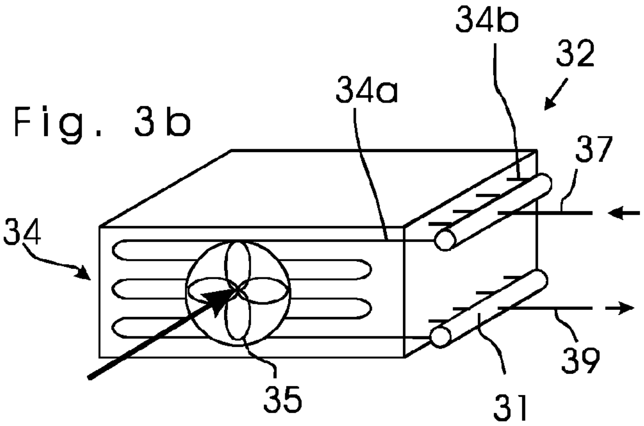
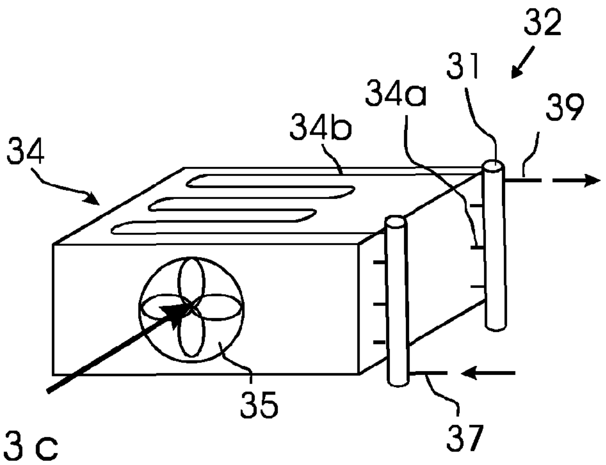
Fig. 3c

COOLING SYSTEM FOR EFFICIENT OPERATION

CROSS-REFERENCE TO RELATED APPLICATIONS

This application is a National Stage application of International Patent Application No. PCT/EP2019/082380, filed on Nov. 25, 2019, which claims priority to European Patent Application No. 18209030.8 filed on Nov. 29, 2018, each of which is hereby incorporated by reference in its entirety.

TECHNICAL FIELD

The invention relates to a cooling system, and to a method of operating a cooling system. More particularly, the invention relates to cooling systems in which an ammonia refrigerant is evaporated in an evaporator.

BACKGROUND

In "Use of Pulse Width modulated Valves in industrial Refrigeration" by L. M. Jessen, presented at IIAR 19$^{th}$ Annual Meeting, Mar. 23-26, 1997, New Orleans, automatic control of refrigerant injection into an air unit on a liquid overfeed pump recirculation system is described. A heated temperature sensor on the air cooler, an air temperature sensor and a pressure transmitter are used as inputs to an electronic controller. The controller continually manages the modulation of the pulse width modulated valve that injects refrigerant into the air unit. To ensure that the circulation ratio is higher than one, the heated temperature sensor is placed on the outlet of the pipe circuit with the highest heat load, for instance the pipe circuit in the incoming air stream on an evaporator with horizontal air flow and vertical refrigerant flow. When liquid is in the pipe, heat from the sensor is removed through refrigerant evaporation. If no liquid is in the pipe, the pipe temperature rises. The controller principle is based on gradual opening of the injection valve while the sensor detects temperatures higher than the saturation temperature.

GB-A-2157447A discloses a heat exchange equipment such as a refrigerator. A compressor conveys gaseous refrigerant through a pressure conduit into a condenser. The liquefied refrigerant arrives through an expansion valve in an evaporator. A suction conduit leading back to the compressor is connected to the outlet of the evaporator. A measuring device detects whether the suction conduit contains dry refrigerant or whether the refrigerant still has liquid components and what degree of moisture. The measuring device acts on a switching device serving to control the expansion valve. As soon as the refrigerant flowing through the suction conduit contains liquid, the expansion valve closes until there is dry refrigerant again. The expansion valve may also be controlled by the degree of moisture present in the refrigerant.

EP-A-1744113 discloses an ice-making machine comprising an evaporator, a compressor, and a condenser. In a freezing cycle, refrigerant is supplied via the compressor and the condenser to the evaporator and returned via a return line to the compressor. In a harvest cycle, refrigerant flows through the return line to defrost the evaporator to harvest ice.

DE-B-1055018 discloses a method for regulating a refrigeration machine in which the refrigerant enters an evaporator in a liquid state and the liquid level in the evaporator is subject to change depending on load. At the exit of the evaporator, the mass ratio of liquid and vapor phase of the refrigerant is measured and the amount of refrigerant entering the evaporator is adjusted in accordance with the measured ratio. The refrigerant flows through a pipe made of a material with high heat conduction resistance, such as a plastic material. A heating element is arranged between a temperature sensor and the wall of the pipe. Heating is effected with constant heating power and the temperature is measured.

EP-A-0680589 discloses control devices suited for detecting and controlling characteristics and mass flow of the working fluid in refrigeration systems including a compressor, a condenser, an expansion means, and an evaporator, all of which are connected in a fluid circuit with a working fluid. The expansion valve is preferably realized in the form of a linear proportional solenoid actuated valve. In normal operation of the heat transfer system, the evaporator outlet quality is regulated preferably nearly 100% gas by varying the flow rate through the solenoid valve. The quality sensor including a thermistor detects quality during a self-heat mode. When the thermistor is heated, it reaches a predetermined temperature that is a function of the percent liquid in the working fluid exiting the evaporator. If no liquid is present, then the thermistor temperature will be at least its set point temperature caused by a current therethrough. If the vapor is superheated, the thermistor will detect the excess temperature and the solenoid valve will be caused to open more so as to increase the mass flow. If the quality of the vapor is less than 100% gas, the liquid droplets cool the thermistor below its set point and the solenoid valve is caused to close more, thus reducing mass flow.

SUMMARY

It may be considered an object to propose a cooling system and an operating method therefor which allow reliable and efficient operation.

This object is addressed by a cooling system according to claim 1, and by a method according to claim 12. Dependent claims refer to preferred embodiments of the invention.

According to the invention, a direct expansion cooling circuit is provided, including at least a compressor, a condenser, and an evaporator. The compressor is disposed to compress ammonia vapor. (It should be noted that the terms "vapor" and "gas" are used interchangeably herein to designate the refrigerant in its gaseous state.) The condenser is disposed to condense the ammonia vapor to obtain liquid ammonia. The evaporator is disposed to evaporate the liquid ammonia.

Due to the type of the cooling system as a direct expansion (DX) cooling system, the evaporator is disposed and operated such that the ammonia refrigerant is fully (or almost fully) evaporated in the evaporator. To ascertain such a high degree of evaporation, known direct expansion cooling systems are operated with a substantial amount of superheat, i.e. within the evaporator the refrigerant absorbs more heat than required for evaporation, such that the refrigerant at least in some portions of the evaporator reaches a temperature above the saturation temperature. Such superheat may be obtained e.g. by increasing one or both of the evaporator surface and temperature difference. Both measures, however, have a detrimental effect on efficiency as well as operation and/or installation cost.

In the cooling system according to the invention, a superheat vapor quality sensor is arranged at a conduit between at least a portion of the evaporator and the compressor. The term "at least a portion" includes that the sensor may be mounted e.g. at the conduit at a distance from the evaporator, directly at the evaporator, or even within the evaporator, such as on a portion of an evaporator tube. The sensor may in particular be arranged at a return line conducting evaporated refrigerant away from the evaporator into the direction of the compressor. As will become apparent from preferred embodiments, the connection between the evaporator and compressor need not be direct, but e.g. an accumulator may be arranged in between to separate a possible rest of liquid refrigerant from the vapor.

The superheat vapor quality sensor is disposed to deliver a sensor signal S indicative of a superheat vapor quality value X of the refrigerant flowing through the conduit at which the sensor is arranged.

The term "superheat vapor quality" is used here to designate a parameter of the refrigerant medium which is indicative both of the mass fraction of gas and liquid and the amount of superheat. The "superheat vapor quality" is related to the known "vapor quality", but extends up to the superheat range.

For a saturated medium existing in a vapor/liquid phase mix, the term "vapor quality" designates a value representing the mass fraction of the medium that is gas (vapor). If the medium consists of only saturated liquid, the vapor quality value is 0%. If the flow consists of only gas at the saturated temperature, the vapor quality value is 100%. For a saturated medium of which a portion exists in the gas phase and another portion in the liquid phase, the vapor quality value will be in between 0% and 100%.

Under superheat conditions, the temperature of the medium is above the saturated temperature and the medium will consist exclusively of gas.

By "superheat vapor quality" a value is designated herein which comprises information both about the vapor quality and the amount of superheat. The "superheat vapor quality" is equal to the vapor quality for vapor quality values of up to 100%. If the medium is superheated, the "superheat vapor quality" value X is above 100%, wherein a higher value indicates a higher amount of superheat.

The vapor quality $X_Q$ may be expressed as $$X_Q=(H-H_{liquid})/(H_{gas}-H_{liquid}),$$

wherein $X_Q$ is the vapor quality, H is the enthalpy and $H_{liquid}\leq H\leq H_{gas}$. The superheat vapor quality $X_S$, extending also into the superheat region, may then be expressed as $$X_S=(H-H_{liquid})/(H_{gas}-H_{liquid}).$$

Thus, the superheat vapor quality $X_S$ as used here for $X_S>100\%$ expresses the amount of superheat present.

The above definition applies exactly to a medium contained in a vessel in equilibrium (steady state). If the medium is flowing within a conduit, the relation between liquid and gas may not be in equilibrium, such that e.g. the gas may be slightly overheated while still liquid particles are present. With the superheat vapor quality $X_S$ defined as above, for a mixture of superheated gas and liquid particles, the total energy may correspond e.g. to $X_S=100\%$ in steady state conditions.

This is reflected in the sensor signal S, which is indicative of the superheat vapor quality $X_S$ even in the superheat region, i.e. which indicates the amount of superheat for $X_S>100\%$.

According to the invention, the superheat vapor quality sensor comprises a heating element and a temperature sensing element. The superheat vapor quality sensor is arranged in thermal contact with a wall of the conduit, e.g. a pipe or tube. The sensor signal S indicative of the superheat vapor quality $X_S$ of the refrigerant flowing through the conduit 34 is obtained from an output of the temperature sensing element 52.

The heating element of the superheat vapor quality sensor is provided to supply heat and may in particular be an electrical heating element, such as e.g. an Ohmic heating element of known resistance. An operating element, such as an electrical driver circuit may be provided to supply heating power to the heating element.

The temperature sensing element may be of any type, preferably to supply an electrical signal indicative of the temperature or of a temperature change. In particular, the temperature sensing element may e.g. be a thermocouple or resistance temperature detector (RTD), such as for example a Pt100 element.

The heating element and the temperature sensing element are thermally coupled to a wall of the conduit. While the conduit wall may be of any material allowing a certain amount of heat conduction, a metal material is preferred, in particular copper and/or aluminum. The thermal coupling of the heating element, temperature sensing element and adjoining conduit wall is preferably very close, such that they assume the same temperature with no or only minimal temperature gradient.

The superheat vapor quality sensor may be referred to as a heated temperature sensor. The underlying sensor principle is based on absorption of heat by the medium within the conduit. The medium is in thermal contact with the inner conduit wall and in case of a temperature difference will absorb heat therefrom. The rate of absorption of heat will differ, depending, besides the temperature difference, on the phase of the medium in direct contact with the inner conduit wall. If a substantial amount of liquid medium is in contact with the inner wall, heat will be absorbed by the medium at a high rate, whereas if the inner wall is "dry", i.e. only in contact with vapor, the heat absorption rate will be low. Thus, the heat absorption will vary depending on the superheat vapor quality $X_S$ of the medium.

As will be explained in greater detail below, in particular with reference to preferred embodiments, a sensor of the type used according to the invention, i.e. a heated temperature sensor, has surprisingly proven to provide a reliable sensor signal both even under superheat conditions mostly prevalent at the sensor position in a direct expansion cooling system according to the invention.

Preferably, the heating element may be disposed and/or operated to deliver a constant amount of heat over time. As heat is supplied from the heating element at a constant rate and conducted through the conduit wall, an equilibrium temperature will be established, which will vary depending on the rate of absorption of heat by the medium and therefore on the superheat vapor quality $X_S$ thereof.

Processing means may be provided, disposed to deliver the sensor signal S based on the output of the temperature sensing element. The sensor signal may be delivered in any form, e.g. as a digital or as an analogue electrical signal, in particular a voltage signal or current signal. Such processing means may be provided within the sensor, close to the sensor or remote therefrom. They may be connected to receive the output of the temperature sensing element, e.g. from a direct electrical connection or any other type of signal transmission.

The sensor may be operated in different ways. While it is preferred to supply a constant amount of heat over time, the heating element may also be operated e.g. by supplying heat bursts such that a change of the resulting output of the temperature sensing element may be observed. Also, the sensor may be operated at different temperature and/or power levels. In a preferred embodiment, the heating element may be disposed and/or operated to provide an amount of heat such that a value of heat divided by a contact area between the sensor and the conduit wall is less than or equal to 0.2 $W/mm^2$.

Processing means may be provided, preferably comprising an electrical circuit and may comprise a microprocessor or microcontroller programmed to process the output of the temperature sensing element to deliver the sensor signal. Processing of the output may comprise any type of signal processing including processing steps which comprise further input such as additional signals or data. For example, the sensor signal may directly reflect the output of the temperature sensing element. In a preferred embodiment, the sensor signal may be derived by calculating a difference between the output and a reference value, such as e.g. a reference temperature, which may be the saturated temperature of the medium within the conduit.

The sensor signal S delivered by the superheat vapor quality sensor is indicative of the superheat vapor quality, which should be understood such that an information about a superheat vapor quality value $X_S$ may be gained from the sensor signal S. This may include that the superheat vapor quality value $X_S$ may be calculated or otherwise deducted based on the sensor signal S, as well as possibly further parameters. However, it may be sufficient for the sensor signal being indicative of the superheat vapor quality if there is a determinable dependency of the sensor signal on the vapor quality value X, or vice versa. For example, the sensor signal may indicate a change amount and/or change direction of the superheat vapor quality value X, i.e. if it increases or decreases. Preferably, the sensor signal may have a strictly monotonous dependency on the superheat vapor quality $X_S$. As will become apparent in connection with preferred embodiments, it may not be necessary to actually obtain specific superheat vapor quality values from the sensor signal to deduct information about the refrigerant, or to effect control based on the state of the refrigerant.

Due to provision of the superheat vapor quality sensor, information about the operating state of the cooling system is readily available, allowing to monitor operation. The information obtained from the sensor signal also allows to verify correct dimensioning of the cooling system. In preferred embodiments the sensor signal S may be used to control operation of the cooling system.

In one embodiment, a controllable evaporator inlet valve may be provided, connected to an inlet of at least one evaporator, such that a quantity of refrigerant supplied to the evaporator may be controlled. For example, the degree of opening of the evaporator inlet valve may be controllable to control the flow of refrigerant through the valve, which may be e.g. a solenoid or motor controlled valve.

Controller means may be provided, disposed to control the evaporator inlet valve depending on the sensor signal S indicative of the superheat vapor quality value $X_S$.

Controlling a DX ammonia cooling system based on the sensor signal, in particular by controlling the evaporator inlet valve, allows optimized operation, which can help to improve efficiency. In particular, it is possible to reduce the amount of superheat while retaining a high degree of evaporation even under varying load conditions. As will become apparent in connection with preferred embodiments, utilizing the sensor signal from the superheat vapor quality sensor enables the possibility to extend the operating range into the two-phase region.

According to the invention, the superheat vapor quality sensor is provided at a horizontally arranged portion of the conduit. As will be explained in more detail with respect to exemplary embodiments, the orientation of a conduit has a significant influence on the spatial distribution of the liquid and vapor constituents of the medium. The liquid constituents will tend to assemble in a bottom portion of the conduit.

This known inhomogeneity is exploited for choosing a desired sensor sensitivity by a corresponding placement of the sensor on the wall of the conduit.

While a sensor arranged on top of the conduit, i.e. in contact with a top portion of the conduit wall, will have a high sensitivity for lower values of the superheat vapor quality, because the amount of liquid at the inner, upper conduit wall will be at a minimum, the invention allows to achieve a different sensitivity by arranging the sensor on a wall of a horizontally arranged portion of the conduit in a lower position, i.e. forming an angle of more than 120° to a vertical upward direction. This will lead, compared to other sensor orientations, to a better distinguishable sensor signal for higher values of the superheat vapor quality.

As the direct expansion system according to the invention is operated preferably in the superheat range, i.e. at rather high values of the superheat vapor quality, the sensor is preferably arranged at least substantially in a bottom position, e.g. under an angle of more than 135° to the upward vertical direction, preferably more than 150°, in particular 170° or more. In this way, while the sensor may have low sensitivity for low values of the superheat vapor quality of below 100%, the sensor signal S will exhibit a suitable change in the superheat range.

Thus, the preferred arrangement of the sensor is suited to provide a sensor signal indicative of the superheat vapor quality of the refrigerant flowing within the conduit. The sensor may be mounted to the outside of the conduit, such that it may be easily installed e.g. to existing tubing without necessity of opening the conduit. Due to the horizontal arrangement of the conduit portion to which the sensor is mounted, a desired sensitivity may be chosen by arranging the sensor in the lower position.

In a preferred embodiment of the invention, an accumulator may be provided within the direct expansion cooling circuit. The accumulator may be arranged to receive the refrigerant evaporated within the evaporator, i.e. between the evaporator and the compressor. The accumulator is preferably disposed to accumulate a liquid portion of the ammonia refrigerant, e.g. in a bottom portion. The compressor may be connected to a top portion of the accumulator such that only vapor is supplied thereto. In a particularly preferred embodiment, the accumulator may be arranged in thermal contact with a conduit arranged between the condenser and the evaporator, i.e. a conduit conducting condensed and therefore heated refrigerant. The conduit may comprise a heating spiral disposed within the accumulator to ensure good thermal coupling to a portion of liquid refrigerant within the accumulator. Alternatively, other separation methods like heat exchangers may also be used to avoid any liquid droplets from being carried into the compressor.

It may be particularly preferred to provide the controller means configured to reduce the mass flow of refrigerant, e.g. by reducing an opening of the evaporator inlet valve, in response to a sensor signal indicative of a lower vapor quality value, and to increase the mass flow of refrigerant, e.g. by increasing an opening of the evaporator inlet valve in response to a sensor signal indicative of a higher vapor quality value. The higher and lower vapor quality values may e.g. be determined relative to one or more reference values, threshold values or to a predetermined setpoint.

Control may be based e.g. on an operating point with a reference setting of the evaporator inlet valve opening and/or a reference sensor signal level. If the sensor signal deviates from the reference sensor signal, the inlet valve opening may be adjusted in accordance with the control strategy. The controller means may employ any suitable control strategy, such as e.g. proportional control, integral control, and/or derivative control. Preferred may be a PID controller.

In the evaporator, the refrigerant may traverse evaporator pipes having at least a first portion exposed to an air flow. The sensor may be arranged on one of the evaporator pipes. While it is possible in principle to arrange the sensor on one of the evaporator pipes in a position within the first portion exposed to the air flow, it is preferably arranged at a second portion thereof located outside of the air flow.

In an evaporator with multiple evaporator pipes, which are e.g. arranged in parallel to each other, the thermal load of the individual evaporator pipes will generally differ, e.g. as a consequence of their arrangement relative to an air flow. At least one of several parallel evaporator pipes will have the lowest thermal load throughout the evaporator. This is understood to designate the pipe in the outlet of which the superheat vapor quality will be lowest throughout all of the outlets of the parallel pipes of the evaporator. The least loaded pipe may be recognized by observing the superheat vapor quality in all outlets of the parallel evaporator pipes when lowering the mass flow to the evaporator starting from an operating point of sufficient superheat, where the superheat vapor quality at the outlet of all pipes is above 100%. As the mass flow of refrigerant is lowered continuously, the least loaded pipe may be recognized in that it is the first to show a superheat vapor quality value of 100%. It may be preferred to arrange the sensor on this evaporator pipe, as in the direct expansion cooling system the complete or near complete evaporation of the refrigerant is required, and the superheat vapor quality in the other evaporator tubes will generally be higher than in the least loaded tube where the sensor is arranged. In particular, the sensor may preferably be arranged at or near an outlet of an evaporator pipe. Alternatively, the sensor may be arranged on the common evaporator outlet conduit.

The superheat vapor quality sensor may provide the sensor signal S dependent on a difference between a reference temperature and a temperature measured by the temperature sensing element. The reference temperature may be a saturation temperature. The reference temperature may be measured and/or calculated. In particular, a reference temperature sensor may be arranged to measure a temperature of the refrigerant within the conduit and/or a pressure sensor may be arranged to measure a pressure of the evaporated refrigerant.

In a preferred embodiment, the sensor may comprise a sensor body made of a metal material. The heating element and the temperature sensing element may be arranged in thermal contact with the sensor body. By providing a sensor body, particularly preferred a massive piece of metal, preferably of copper and/or aluminum or other metal of very good heat conduction, the thermal coupling of the temperature sensing element, heating element and conduit wall is improved. In a particularly preferred embodiment, the heating element and/or the temperature sensing element may be embedded, e.g. arranged within in one or more cavities formed within the sensor body. The heating element and/or temperature sensing element may be surrounded by the material of the sensor body, thus providing good thermal coupling.

The sensor may be mounted to the conduit wall in different ways, e.g. preferably by clamping, i.e. mechanically urging the sensor into direct contact with the conduit wall. In order to obtain good coupling, the sensor may comprise a contact portion shaped to conform to the outer shape of the conduit wall. In particular, the sensor may comprise a concave portion, and the conduit wall may be at least partially received within the concave portion. It is possible for the sensor to comprise multiple concave portions of different shape, such as e.g. different curvature, to conform to different shapes of conduits, e.g. different outer tube diameters.

In a preferred embodiment, a thermal insulating element may be arranged to cover at least the superheat vapor quality sensor and a part of the conduit. Such an insulating element may reduce external influences on the measurement, such as by ambient temperature.

While the conduit portion to which the sensor is mounted may in principle have any shape in cross-section, a circular cross-section is preferred.

While it is possible for the sensor and/or a sensor body thereof to contact the conduit over a large portion of its circumference, and the sensor/sensor body may even entirely surround the conduit, it may be preferred to arrange the sensor in contact with the conduit wall over a contact angle of less than 90°, preferably 45° or less. As explained above, this allows to more accurately choose a desired sensitivity.

BRIEF DESCRIPTION OF THE DRAWINGS

Embodiments of the invention will be described with reference to the drawings, in which

FIG. 3*a*, 3*b*, 3*c* show schematic representations of different types of evaporators;

DETAILED DESCRIPTION

Figure 1:
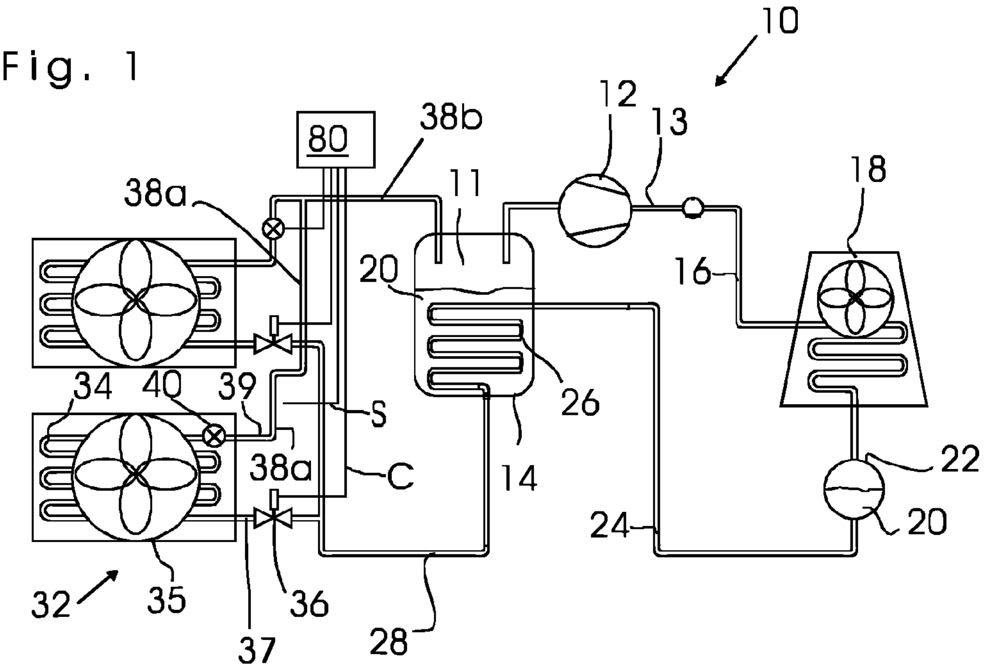
FIG. 1 shows a schematic representation of an embodiment of a cooling system.

FIG. 1 shows an embodiment of a cooling system 10.

The cooling system 10 is a direct expansion (DX) cooling system operated with ammonia as refrigerant.

The cooling circuit of the cooling system 10 comprises a compressor 12 to compress ammonia vapor 11 contained in the upper portion of a suction accumulator 14 filled with gaseous ammonia 11 and a rest of liquid ammonia 20 accumulated at the bottom. Compressed ammonia vapor 13 obtained from the compressor 12 is supplied through a conduit 16 to a condenser 18, where it condenses at least partly to collect as liquid ammonia 20 in a collector 22.

The hot liquid ammonia 20 is supplied through a first conduit 24 and a second conduit 28 to evaporators 32. The first conduit 24 comprises a heating spiral 26 in the suction accumulator 14 for the heated liquid refrigerant to aid in evaporating liquid ammonia 20 there.

In the example shown, the cooling system 10 comprises two identical evaporators 32 connected in parallel. The skilled person will recognize that different embodiments of the cooling system 10 may comprise a different number of evaporators 32, such as only one or more than two evaporators. In the following, only one of the evaporators 32 connected in parallel will be described.

The liquid ammonia 20 is supplied through a controllable evaporator inlet valve 36 to the evaporator 32. The evaporator 32 comprises a plurality of evaporator tubes 34 in thermal contact with an air flow 33 of a ventilator 35.

The evaporator 32 is preferably a DX evaporator type with one common liquid inlet 37 and one common outlet 39. The evaporator 32 has at least one pass, i.e. one evaporator tube 34 passing from inlet 37 to outlet 39. Preferably, the evaporator 32 has multiple parallel passes, e.g. 6-8 parallel evaporator tubes 34 connected between the inlet 37 and outlet 39. Different evaporator types can be used e.g. as shown in FIG. 3*a*-3*c*.

FIG. 3*a* shows a bottom feed evaporator where the refrigerant is supplied through a lower feed line 37, distributed to flow along the evaporator tubes 34 in thermal contact with the air flow 33, collected and returned in an upper return line 39.

FIG. 3*b* shows a top feed evaporator in which the refrigerant is supplied through an upper feed line 37, distributed into the evaporator tubes 34, collected and returned in a lower return line 39.

FIG. 3*c* shows a side/bottom feed evaporator. The refrigerant is supplied through a lower feed line 37 at the evaporator front, distributed into the evaporator tubes 34, collected and returned in an upper return line 39.

In each case the air flow 33 is directed traverse to the refrigerant flow through the evaporator tubes 34. Through the thermal contact between the air flow 33 and the evaporator tubes 34, heat from the air flow 33 is transferred to the refrigerant flowing within the evaporator tubes 34, such that the refrigerant is evaporated.

The degree to which the ammonia medium flowing through the evaporator tubes 34 is evaporated may be expressed in terms of the vapor quality value X. The liquid ammonia supplied through the feed line 37 will have a low vapor quality value X of e.g. 10-20%. As the ammonia refrigerant flowing through the evaporator tubes 34 receives heat transferred from the air flow 33, more and more will evaporate such that the vapor quality will rise.

As the system 10 is direct expansion (DX) cooling system, the refrigerant will be fully evaporated, i.e. the mass flow of refrigerant supplied through the feed line 37 will be less than the evaporator capacity $C_E$, such that the vapor quality in the return line 39 will be high. The cooling system will be operated with a certain amount of superheat, i.e. within the evaporator 32 the refrigerant will not only absorb sufficient heat to evaporate fully (vapor quality X=100%), but will absorb more heat to enter a superheated state, i.e. assume a temperature above the saturation temperature $T_{Sat}$.

The vapor quality value X, as defined above, indicates within the refrigerant the mass ratio of gas to the total gas/liquid mixture. It is generally different from a void fraction, i.e. the volume fraction of the flow-channel volume that is occupied by the gas phase. While the void fraction is determined by the relative volume, the vapor quality value X is the thermal dynamic vapor quality based on mass fraction.

For a medium flowing through a conduit, the vapor quality X usually cannot be measured directly, as this would require a separation of vapor and liquid to weigh the respective mass, which is not possible in a flowing medium. Moreover, the liquid phase portion and the vapor phase portion may distribute differently within the conduit and may travel at different velocities.

The state of the refrigerant at the outlet of the evaporator 32, both with regard to the vapor quality X and to the amount of superheat, may be expressed in terms of the superheat vapor quality value $X_S$.

For X<100% the superheat vapor quality value $X_S$ is equal to the vapor quality value X. For fully evaporated refrigerant, the superheat vapor quality $X_S$ assumes values of 100% and above, indicating the amount of superheat. Referring to the definition above, since the flowing refrigerant may not be in an equilibrium state and may comprise e.g. both superheated vapor and remaining liquid particles, the superheat vapor quality value $X_S$ should be understood to represent the energy equivalent to the equilibrium state.

Within the evaporator 32, the heat transfer from the air flow 33 to the individual parallel evaporator tubes 34 will differ. For example, in the top and bottom feed evaporators 32 shown in FIG. 3*a*, 3*b*, the first evaporator tube 34*a* will carry the highest heat load, i.e. at the outlet of the evaporator tube 34*a* before it enters the collecting conduit 31, the superheat vapor quality $X_S$ will be the highest of any of the evaporator tubes 34. The last evaporator tube 34*b* will have the least heat load, i.e. the superheat vapor quality $X_S$ at its outlet will be the lowest of all evaporator tubes.

The evaporated refrigerant from the evaporator tubes 34 is collected in a common collecting conduit 31 and returned through a return line 39.

Back in FIG. 1, the ammonia vapor 11 returned from the evaporator 32 through the return line 39 is guided through an individual first return conduit portion 38*a* and a common second return conduit portion 38*b* back into the suction accumulator 14, where the gas velocity will be reduced, and any rest of liquid ammonia 20 contained within the flow collects in the lower portion.

For a cooling system 10 with multiple evaporators 32, each evaporator 32 comprises a separate evaporator inlet valve 36 branching off from the conduit 28 and a separate first return conduit portion 38*a* for the partly evaporated ammonia. The first return conduit portions 38*a* from the evaporators 32 merge at the common second return conduit portion 38*b*.

For each of the evaporators 32, a superheat vapor quality sensor 40 is provided at one of the evaporator tubes 34 to deliver a sensor signal S indicative of the superheat vapor quality of the ammonia medium flowing through the evaporator tube 34.

Figure 2A:
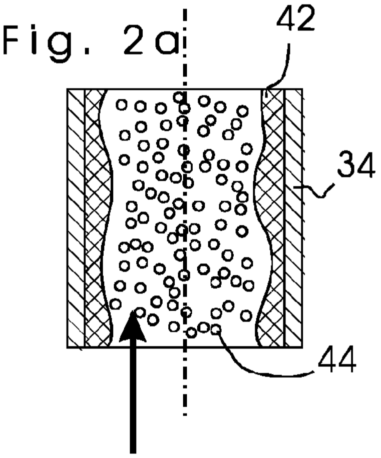
FIG. 2*a* shows a schematic representation of a longitudinal sectional view of the flow of a medium through a vertical portion of a conduit of the cooling system of FIG. 1.

Depending e.g. on the flow speed and on the vapor quality, the flow of mixed liquid/vapor ammonia through a conduit such as an evaporator tube 34 may follow different flow regimes. FIG. 2*a* schematically illustrates an annular flow in a vertically arranged portion of a conduit 34. A liquid film 42 flows on the conduit wall and a two-phase flow 44 of ammonia liquid and vapor flows near the center. As the thickness of the fluid film 42 will be equally distributed in a vertically oriented conduit 34, it will appear as a circle in cross-section. An annular flow regime may e.g. be expected in a conduit 34 at a usual flow speed of 5-15 m/s.

Figure 2B:
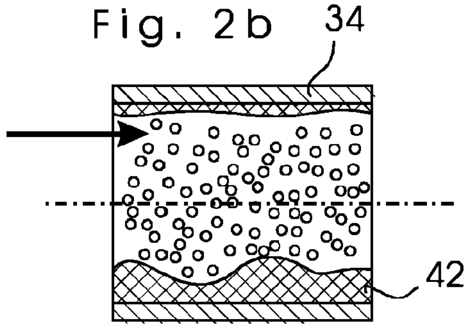
FIG. 2*b*, 2*c* show in schematic representation a longitudinal section and a cross-section of a flow of a medium through a horizontal portion of a conduit.
Figure 2C:
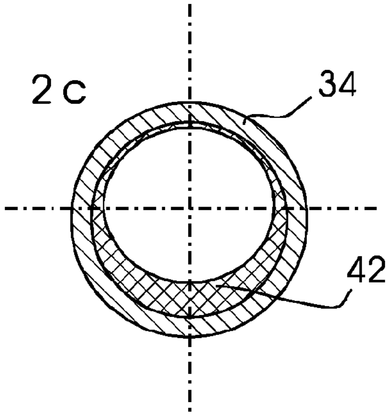
Figure 4:
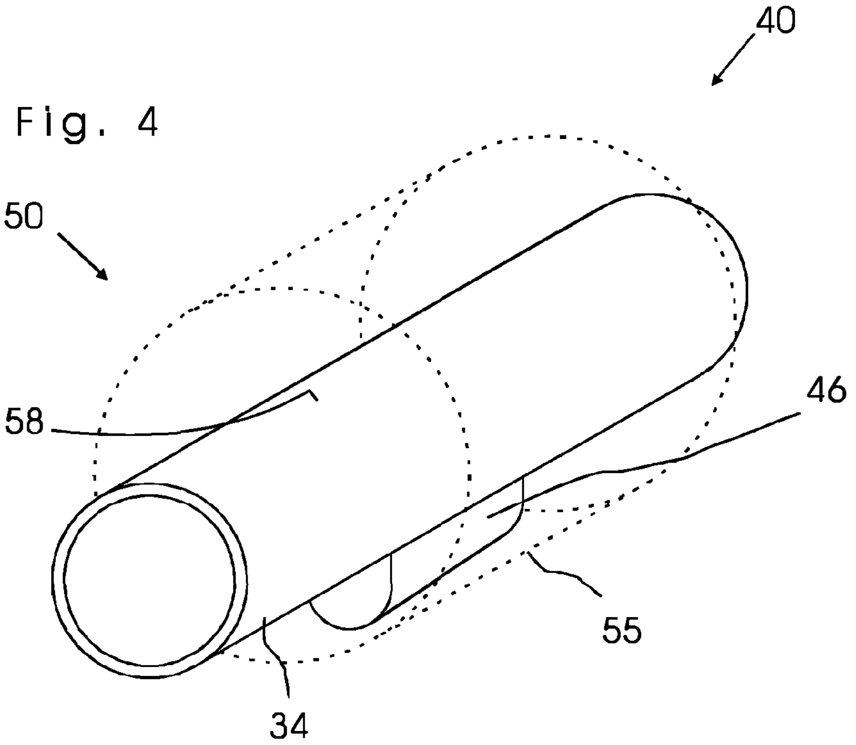
FIG. 4 shows a perspective view of a sensor arrangement in the cooling system of FIG. 1.
Figure 5:
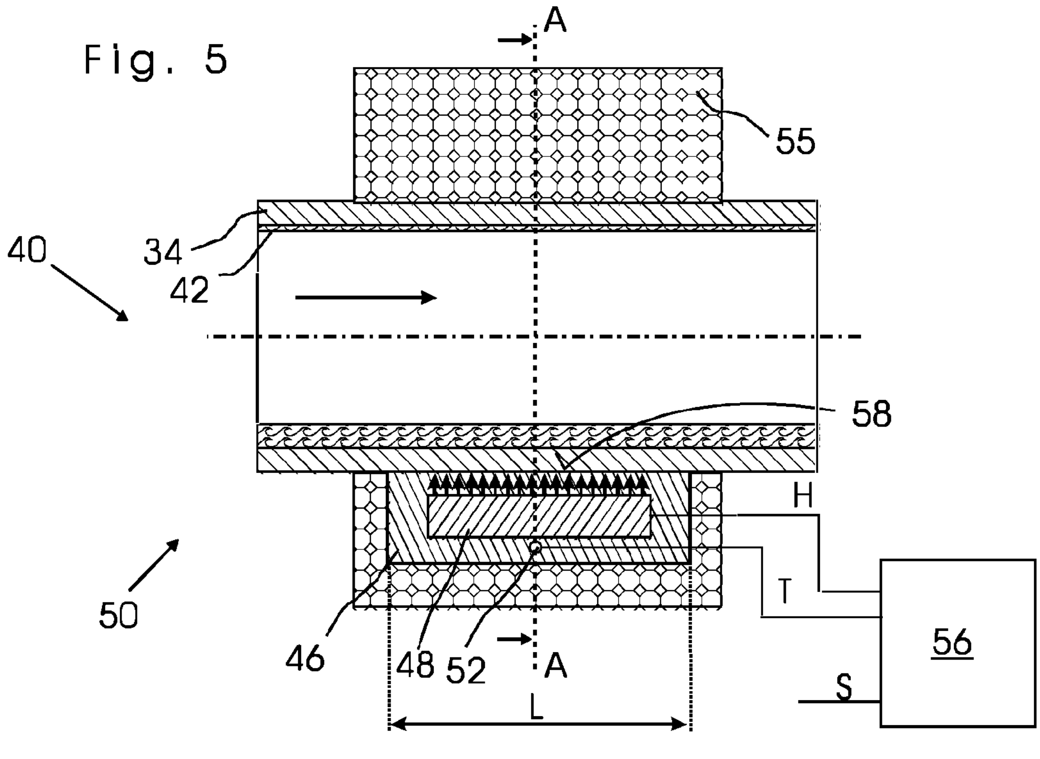
FIG. 5 shows a longitudinal sectional view of the sensor arrangement of FIG. 4.
Figure 6:
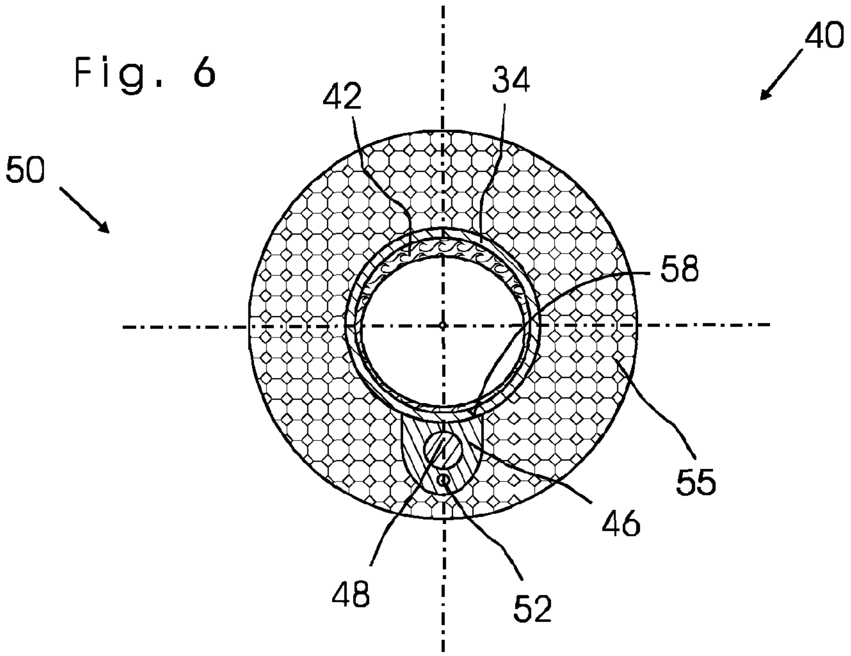
FIG. 6 shows a cross-sectional view of the sensor arrangement of FIG. 4,5 with the section along A . . . A in FIG. 4.
Figure 7:
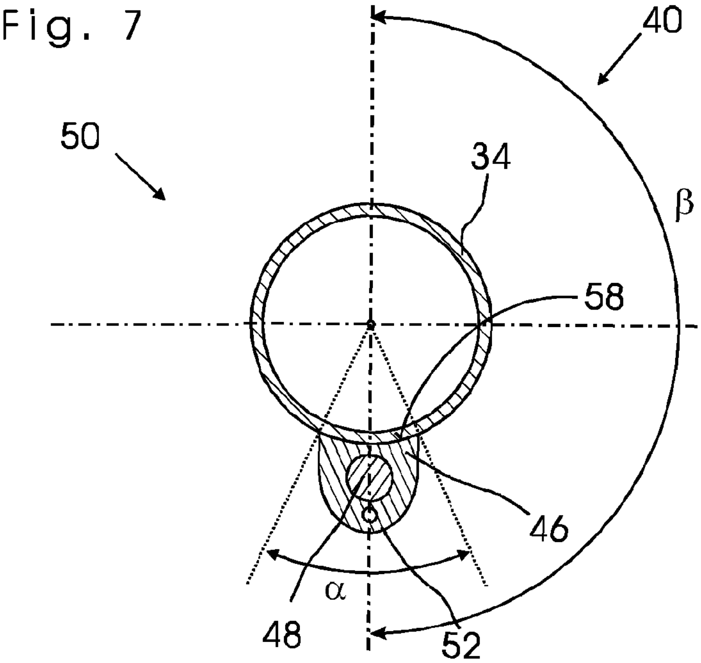
FIG. 7 shows a cross-sectional view of a part of the sensor arrangement of FIG. 4-6.

In a horizontally arranged portion of the conduit 34 as shown in FIG. 2*b*, 2*c*, the fluid film 42 will be thicker at the bottom and thinner at the top due to the influence of gravity.

The sensor 40 provides a sensor signal S which is indicative on the superheat vapor quality value X. As will be described in detail, the sensor 40 derives the signal S based on temperature measurements in response to heat supplied to the conduit 34 and to the refrigerant medium flowing therein.

An embodiment of a sensor arrangement 50 including a sensor 40 attached to an evaporator pipe 34 is shown in FIG. 4-7.

The sensor 40 comprises a sensor body 46 with a heating element 48 and a temperature sensor 52 arranged embedded within the sensor body 46. The sensor body 46 is clamped to the outer wall of the conduit 34.

The sensor body 46 is a solid piece of a metal material of good heat conduction such as copper or aluminum. It is positioned on the outside of the conduit 34 in contact with an outer tube wall thereof. The sensor body 46 has a contact surface 58 in direct contact with the tube wall of the conduit 34. The sensor body 46 and the contact surface 58 extend over a length L in longitudinal direction of the conduit 34. The contact surface 58 has a concave shape to conform to the curved shape of the outer tube wall of the conduit 34.

The portion of the conduit 34 to which the sensor 40 is mounted is arranged horizontally. As shown in particular in FIG. 7, the sensor body 46 is arranged at the bottom of the outer tube wall of the conduit 34. An installation angle measured between a line from the center of the conduit 34 to the center of the contact surface 58 and an upward vertical direction is 180°. The contact surface 58 in the embodiment extends over a contact angle α of about 50°. Therefore, in the example the sensor body 46 is in direct contact with the tube wall over an angular range of 155°-205° to the vertical axis.

An insulation 55 is provided to surround the sensor body 46 and a portion of the conduit 34 to thermally insulate it. The heating element 48 arranged within the sensor body 46 is an electric heating element, e.g. an electrical resistor of defined electrical resistance, connected to a driver circuit 56. The temperature sensor 52 is also an electrical temperature sensor such as e.g. a PT100 element, electrically connected to the driver circuit 56.

The driver circuit 56 operates the heating element 48 to deliver a defined amount of heat, constant over time. The heat from the heating element 48 distributes within the sensor body 46 and to the wall of the conduit 34. Due to the good heat conduction and high mass of the massive sensor body 56, the heating element 48, temperature sensor 52, and the adjoining portion of the wall of the conduit 34 are all thermally closely coupled so that they will assume a common temperature T with only minimal temperature gradient. Due to the insulation 55, the temperature T will be an equilibrium temperature dependent on the constant power H of the electrical heating and an amount of heat per time transferred to the refrigerant medium within the conduit 34.

In a preferred embodiment, the area of the contact surface 58 may e.g. be about 5 $cm^2$, and an electrical heating power H may e.g. be 25 W, such that the specific power per $cm^2$ is 5 $W/cm^2$.

The transfer of heat from the wall of the conduit 34 to the refrigerant flowing within the conduit 34 is dependent on the phase of the refrigerant in contact with the wall. If the wall portion in contact with the contact surface 58 is wetted with liquid ammonia, the heat transfer is very high, and heat from the heating element 48 and conducted through the sensor body 46 and the wall of the conduit 34 is absorbed by the refrigerant at a high rate. If the inside of the wall is "dry", i.e. not in contact with a substantial amount of liquid ammonia, the rate of transfer of heat is significantly lower.

Under the constant supply of heat H from the heating element 48, the wall of the conduit 34 and the sensor body 46 will assume different equilibrium temperatures T in response to different vapor quality values X and different amounts of superheat.

Figure 8:
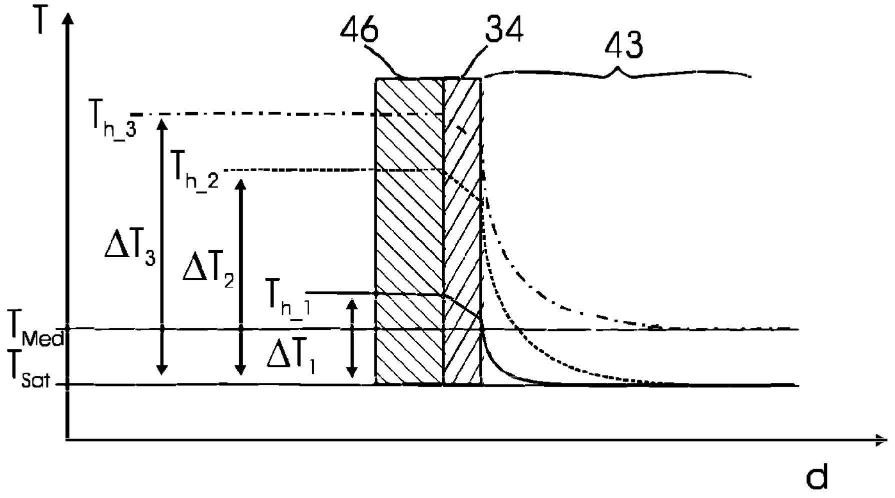
FIG. 8 shows a diagram of temperature curves for the sensor of FIG. 4-6.

FIG. 8 schematically shows curves of the temperature T over a radial distanced in the region of the interface between the sensor body 46, conduit wall 34, and interior 43 of the conduit 34. The diagram shows as $T_{Sat}$ the saturated temperature and $T_{Med}$ as the temperature of the ammonia refrigerant in the interior 43 of the conduit 34, which is above $T_{Sat}$ in a superheat case.

In FIG. 8, the lowest curve (solid line) shows the temperature curve for a case where a significant amount of liquid ammonia is present in the interior 43 of the conduit 34, and in particular in contact with the wall of the conduit 34 (e.g. for a superheat vapor quality $X_S$ of 30% or less). In the center of the interior 43, the ammonia is at the saturated temperature $T_{Sat}$. Due to the heating power supplied to the sensor body 46, a temperature gradient establishes between the sensor body 46 and the interior 43 of the conduit 34, leading to the curve shown. Following the curve from right to left in FIG. 8, the temperature T starts from $T_{Sat}$ and increases towards the wall of the conduit 34. Within the wall of the conduit 34, the temperature further increases. Within the sensor body 46, the higher temperature $T_{h\_1}$ is reached.

The middle curve (dashed line) in FIG. 8 shows the temperature curve if the interior 43 is filled only with gas at a superheat vapor quality value $X_S$ of 100% but no superheat is present. As for the above described dotted line, the ammonia in the center of the interior 43 is at the saturated temperature $T_{Sat}$. Following the dashed curve from right to left, the temperature T increases towards the wall of the conduit 34 and further within the wall of the conduit 34 up to a temperature $T_{h\_2}$ of the sensor body 46. Due to the much lower heat conduction at the inner surface of the wall of the conduit 34, the temperature $T_{h\_2}$ of the sensor body 46 is much higher than in the case of liquid refrigerant.

The top curve (slash-dotted line) in FIG. 8 shows the temperature curve if the interior 43 is filled with gas at a superheat vapor quality value $X_S$ of above 100%, i.e. the refrigerant is fully evaporated (vapor quality X=100%) and a certain amount of superheat is present. The ammonia in the center of the interior 43 is at the temperature $T_{Med}$ above the saturated temperature $T_{Sat}$. As for the curves explained above, the temperature T increases towards the wall of the conduit 34 and further within the wall of the conduit 34 up to a temperature $T_{h\_3}$ of the sensor body 46, which due to the higher temperature of the ammonia within the conduit 34 is higher than the temperature $T_{h\_2}$ for X=100% but no superheat.

The value considered indicative of the superheat vapor quality is the temperature difference ΔT between the temperature of the sensor body 46 and the saturated temperature $T_{Sat}$. For low vapor quality (e.g. X<30%), the temperature difference is $T_{h\_1}$. The corresponding temperature difference for this case ΔT1 as shown in FIG. 8 is relatively small. For a superheat vapor quality value $X_S$=100% (no superheat), the temperature of the sensor body 46 is at $T_{h\_2}$, higher than $T_{h\_1}$, and the temperature difference is ΔT2, which is higher than ΔT1.

In the superheat region with a superheat vapor quality value $X_S$>100% the temperature of the sensor body 46 will be at $T_{h\_3}$, higher than $T_{h\_1}$ and $T_{h\_2}$, such that the temperature difference ΔT3 will be high.

Thus, a sensor signal S derived from the temperature difference ΔT is indicative of the superheat vapor quality value $X_S$, i.e. show a further variation beyond $X_S$=100% indicating the amount of superheat.

Thus, the temperature reading T from the temperature sensor 52 processed in the driver circuit 56 of the sensor 40 is indicative of the superheat vapor quality $X_S$. The sensor signal S is derived from the measured temperature value T by calculating the temperature difference ΔT to the saturated temperature $T_{Sat}$, which may be calculated e.g. based on a measurement of the temperature at the inlet of the evaporator 32, or alternatively a measurement of pressure at the outlet of the evaporator 32 is made and the saturation temperature calculated using the known relation between pressure and saturation temperature.

The sensor signal S may be provided differently from the driver circuit 56, e.g. as a digital signal or as an analog electrical signal. In one preferred embodiment, the sensor signal S is a current signal, for example with a current in the range of 4-20 mA.

As explained above with reference to FIG. 2*b*, 2*c*, the distribution of liquid and vapor ammonia refrigerant within the conduit 34 is not homogenous. In particular for annular flow in a horizontally arranged portion of the conduit 34, there will be a distribution with more of the liquid portion of the refrigerant arranged at the bottom and less on top.

Figure 9:
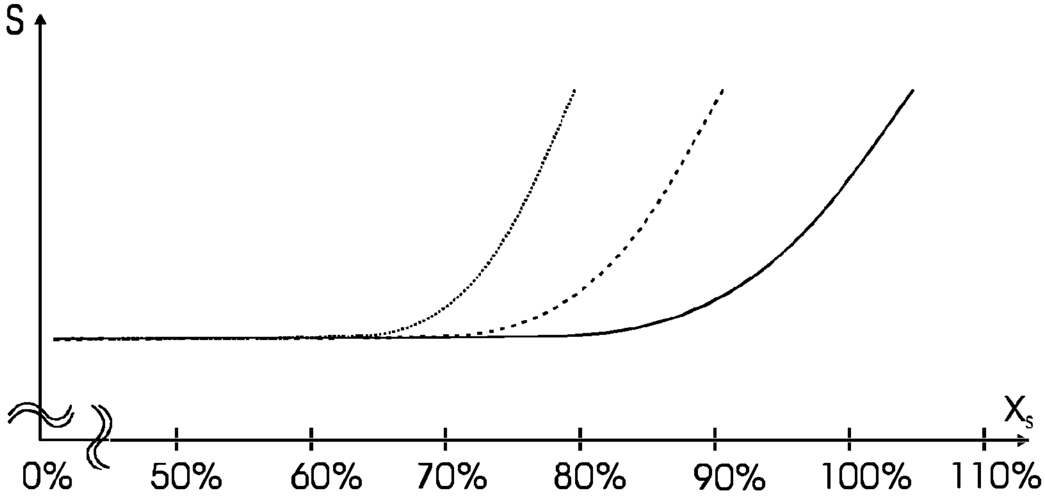
FIG. 9 shows a diagram of a dependency of a sensor signal on a vapor quality value for the sensor of FIG. 4-6.

The position of the sensor 40 has an important influence on the temperature reading T and derived sensor signal S obtained for different superheat vapor quality values $X_S$. FIG. 9 shows curves of the sensor signal S dependent on the superheat vapor quality $X_S$.

The solid line shows the sensor signal S of the sensor 40 arranged at the bottom of the conduit 34 as shown in FIG. 4-7. Due to liquid ammonia accumulating within the conduit and the interior of the wall of the conduit being in contact with the liquid ammonia, the sensor signal for superheat vapor quality values $X_S$ up to about 80% remains constant. From about 85% on, the sensor signal S shows a strictly monotonous rise. The sensor signal S continues to rise in the superheat region of $X_S$>100%, such that the sensor signal S is indicative of the superheat vapor quality value $X_S$.

Figure 11:
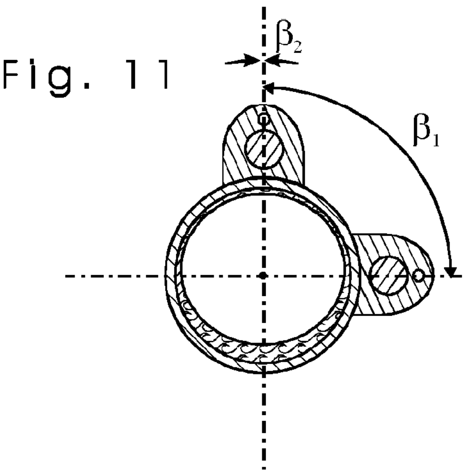
FIG. 11 shows alternative embodiments of sensor arrangements.

For alternative arrangements of a sensor 40 on the conduit 34 as shown in FIG. 11 either to the side (under an angle β1 of 90° to the upward vertical direction) or on top (under an angle β2 of 0° to the upward vertical direction), the curve of the sensor signal S in dependency on the vapor quality value X differs. In FIG. 9 the dashed line shows the sensor signal S for a sensor 40 arranged under an angle of β1=90° and a dotted line shows the sensor signal S for a sensor 40 arranged under an angle of β2=0°. The smaller the angle of arrangement β is, the lower the threshold of the superheat vapor quality value $X_S$ required to obtain a rising sensor signal S. However, for the sensor arranged on top (dotted line) or horizontally (dashed line), the curve of the sensor signal rising earlier than in the case of the sensor arranged at the bottom may reach a maximum value and not show a desirable sensitivity for the superheat range of $X_S$>100%.

Therefore, the bottom arrangement of the sensor 40 under an angle of β=180° as in FIG. 4-7 is preferred for the sensor 40 to obtain a well usable signal S for high values of the superheat vapor quality $X_S$ extending into the superheat region X>100%.

It should, however, be recognized that the sensor signal S does not necessarily provide an exact measurement of a specific superheat vapor quality value $X_S$. While in an effective working range of the sensor 40 there is a strictly monotonous dependency of the sensor signal S on the superheat vapor quality value $X_S$ as shown in FIG. 9, the actual curve may also be dependent on other parameters, such as the distribution of liquid and vapor within the conduit 34, the flow speed, the specific effect of the heating element 48. Thus, obtaining exact measurements of the superheat vapor quality $X_S$ from the sensor signal S may require additional information or assumptions, such as to the flow regime. Taking the additional information into account e.g. by calculations or by calibration, it is possible to obtain a value for the superheat vapor quality $X_S$. However, as will be shown below, due to a monotonous dependency of the sensor signal S on the superheat vapor quality $X_S$, even without such calibration the sensor signal S may nevertheless be used to observe operation and to effect control of the cooling system 10 based on the sensor signal S.

The sensor 40 may be arranged in different positions within the cooling system 10 of FIG. 1. In the most preferred embodiment, the sensor 40 is arranged at the evaporator tube 34*b* with the least heat load (FIG. 3*a*-*c*). The sensor 40 is further preferably arranged at the end of the evaporator tube 34*b* (although preferably outside of the air flow 33), i.e. the outlet of the tube 34 before entering the collecting conduit 31.

At this position within the system 10 and evaporator 32, the superheat vapor quality $X_S$ will generally be the lowest. Therefore, this position is well suited to obtain the sensor signal S to ensure that the system 10 is operated in the superheat range $X_S$>100%. Alternatively, the sensor 40 may be arranged in a different position, or a plurality of sensors 40 may be arranged at different evaporator tubes 34. For evaporators 32 where the load distribution between each of the evaporator tubes 34 is known, the sensor 40 may alternatively be arranged e.g. on another evaporator tube 34 in order to obtain a different sensitivity. Also, it is possible to adjust the sensitivity by using a different mounting position of the sensor 40 as explained above with reference to FIG. 11.

In alternative embodiments, the sensor 40 may be arranged on the return conduit 38*a*.

In the direct expansion ammonia cooling system 10 of FIG. 1, the sensor signals S from the superheat vapor quality sensor 40 of each evaporator 32 are supplied to a controller 80. The controller 80 is a computer programmed to execute a control program to derive a control signal C from the sensor signal S. The control signal C is supplied to the control valve 36 of each evaporator 36 and controls the degree of opening of the control valves 36, and therefore the mass flow of refrigerant through the control valves 36. The control valves 36 are for example solenoid valves controllable by control signals C.

The control objective pursued by the controller 80 is to operate the system 10 stably with a minimum required superheat, however sufficient to maintain the cooling capacity required.

The degree of opening of the control valves 36 determines the amount of liquid ammonia refrigerant supplied to each evaporator 32. A circulation rate N indicates the ratio of the mass flow of ammonia supplied to an evaporator 32 and the rated/nominal capacity of the evaporator.

In direct expansion systems such as the cooling system 10 shown in FIG. 1, the circulation rate N is below 1, i.e. the mass flow of liquid ammonia to each evaporator 32 is lower than the capacity of the evaporator 32, such that the ammonia is fully evaporated and the superheat vapor quality $X_S$ in the evaporator conduits 34 is above 100%. The superheat vapor quality value $X_S$ will be lowest in the evaporator tube 34*b* with the least heat load, where the sensor 40 is arranged.

The evaporator capacity is not constant, but dependent on the superheat vapor quality $X_S$. As more of the ammonia refrigerant is evaporated, less of the inner surface of the walls of the evaporator tubes 34 will be in contact with liquid ammonia. The heat transfer from "dry" tube walls to the refrigerant medium, however, is significantly less than the heat transfer from tube walls in contact with a liquid film 42 as shown e.g. in FIG. 2*a*-2*c*. Therefore, the evaporator capacity decreases for low circulation rates N, corresponding to high values of the superheat vapor quality $X_S$, since the superheat vapor quality $X_S$ is generally the reciprocal value of the circulation rate N.

To ensure complete evaporation, the evaporators 32 of the direct expansion cooling system 10 are designed and operated to superheat the ammonia refrigerant, i.e. obtaining a positive temperature difference by which the gas temperature of the ammonia vapor is above the saturation temperature. Superheat is obtained e.g. by increasing the evaporator surface, or the temperature difference, or both, having a negative effect on operation and/or installation cost.

As a consequence, it is desirable to operate the cooling system 10 with a reduced amount of superheat while ensuring complete or near complete evaporation.

The cooling system 10 is operated by the controller 80 to reduce the amount of superheat, even allowing to extend the control range into the two-phase region. Since this may entail an amount of liquid droplets to be carried through the return conduits 38*a*, 38*b* with the vapor, the suction accumulator 14 is provided with the heating spiral 26 through which the hot condensate is conducted, such that any liquid ammonia 20 accumulated there will be evaporated.

Operation and control of the ammonia direct expansion cooling system 10 of FIG. 1 will be explained with reference to FIG. 10.

Figure 10:
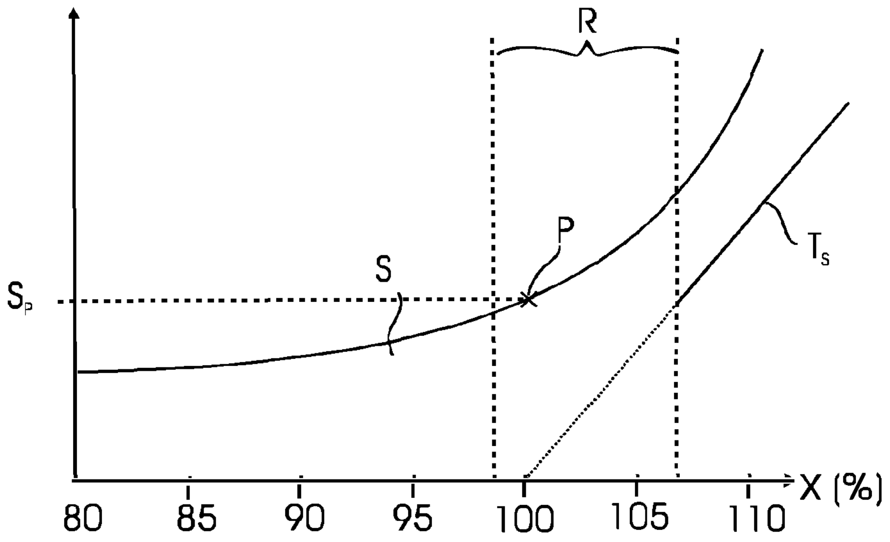
FIG. 10 shows a diagram of the dependency of a sensor signal and a superheat value on a circulating rate.

In FIG. 10, the sensor signal S and a superheat value $T_S$ are shown in dependence on the vapor quality value X. Since the cooling system 10 is operated in the superheat range near a vapor quality of X=100%, only high vapor quality values X of 80-110% are shown on the x-axis of FIG. 10.

The sensor signal S as shown increases with increasing vapor quality X. An amount of superheat $T_S$ increases linearly from Zero at X=100%.

While previously known direct expansion cooling systems are operated with a relative high superheat, the cooling system 110 is operated by the controller 80 in a region of low superheat, extending down up to the two-phase region close to $X_S$=100%. In the example shown, a control range R may be e.g. 98%<X<107%.

While the amount of superheat may be determined by measuring the temperature of the evaporated refrigerant, such a temperature measurement proves difficult in the low superheat region, e.g. X<102%. In this region, there will still be a certain amount of liquid drops contained within the flow of evaporated refrigerant. A temperature sensor provided at the conduit 34 however will show very different temperature readings depending on whether at the point of contact between the sensor and the ammonia flow the ammonia is in liquid (e.g. droplet) or in vapor phase. For this reason, a temperature reading may not reliably be used for control of the cooling system 10 in the control range R.

However, as shown in FIG. 10, the sensor signal S provides information about the superheat vapor quality $X_S$ throughout the control range R.

Thus, an operating point P may be chosen which may be e.g. at or near $X_S$=100. At the operating point, the sensor signal S may take a known reference value S. The controller 80 controls the cooling system 10 depending on the sensor signal S. If the sensor signal S is below the reference sensor signal $S_P$, i.e. if the superheat vapor quality value $X_S$ is below the operating point P, the controller 80 will provide a control signal C to decrease opening of the evaporator inlet valve 26 to increase the amount of superheat. If the sensor signal S is above the operating point sensor signal $S_P$, i.e. the superheat vapor quality value $X_S$ is above the operating point P, the controller 180 will provide a control signal C to increase opening of the evaporator inlet valve 26, reducing the amount of superheat.

Thus, the controller 80 will continuously monitor the sensor signal S, which may be the temperature difference ΔT (or, alternatively, the temperature T so that the controller 80 may calculate ΔT by subtracting the reference temperature $T_{Sat}$). Based on the defined setpoint P and the sensor signal S compared to the setpoint sensor signal $S_P$, the controller 80 will reduce or increase mass flow into the evaporator 32.

The controller 80 may further incorporate an anti-windup for fast recovery after substantial load variations, i.e. after sudden high heat loads when the setpoint P cannot be achieved, e.g. if the evaporator 32 "overheats" or if insufficient liquid refrigerant is available. In such cases indicated by a high sensor signal S, the control 80 may be disposed to abandon closed-loop control and supply a control signal C to fully open the evaporator inlet vale 36. After the sensor signal S returns to the usual range, the controller 80 may resume closed-loop control.

In case of a reduced capacity of the evaporator 32, e.g. when the surface of the evaporator 32 is covered with ice, the controller 80 will detect a reduced sensor signal S and react by controlling the evaporator inlet valve 36 to reduce the mass flow of refrigerant.

It should be kept in mind that the above embodiments are merely examples of the cooling systems, sensor arrangements, operating methods, and sensing methods according to the invention. The invention is not limited to the disclosed embodiments.

For example, the control strategy and parameters, in particular the specific values of the control range R are given as examples only. The sensor design may differ, and the sensor may e.g. be applied in a different position within the cooling system or within the evaporator. The skilled person will recognize further possible modifications to the disclosed embodiments.

What is claimed is:

1. A cooling system, comprising a direct expansion cooling circuit for an ammonia refrigerant, including at least a compressor to compress ammonia vapor, a condenser to condense said ammonia vapor to obtain liquid ammonia, and an evaporator to evaporate said liquid ammonia, wherein a superheat vapor quality sensor is arranged at a conduit between at least a portion of said evaporator and said compressor, said superheat vapor quality sensor being arranged in thermal contact with a wall of said conduit at a contact surface of said superheat vapor quality sensor, said superheat vapor quality sensor comprising a heating element and a temperature sensing element, said superheat vapor quality sensor being disposed to deliver a sensor signal indicative of a superheat vapor quality of said refrigerant flowing through said conduit from an output of said temperature sensing element wherein said superheat vapor quality sensor is arranged on a horizontally arranged portion of said conduit in a position forming an angle of more than 120° as measured between a line from a center of said horizontally arranged portion of said conduit to a center of said contact surface and a line extending in a vertical upward direction from said center of said horizontally arranged portion of said conduit.

2. The cooling system according to claim 1, further comprising a controllable evaporator inlet valve connected to an inlet of said evaporator, and controller means disposed to control said evaporator inlet valve depending on said sensor signal.

3. The cooling system according to claim 2, wherein said controller means are configured to reduce an opening of said evaporator inlet valve in response to a sensor signal indicative of a lower superheat vapor quality value, and to increase an opening of said evaporator inlet valve in response to a sensor signal indicative of a higher superheat vapor quality value.

4. The system according to claim 1, wherein said evaporator comprises a plurality of pipes having a first portion exposed to an air flow and a second portion located outside of said air flow, said superheat vapor quality sensor being arranged on said second portion of one of said plurality of pipes.

5. The system according to claim 4, wherein one pipe of said plurality of pipes of said evaporator has a lowest thermal load, and said superheat vapor quality sensor is arranged on said one pipe.

6. The system according to claim 1, wherein said sensor signal is provided based on a reference temperature, said reference temperature being a measure of a temperature of said liquid refrigerant and/or a measure of a pressure at an outlet of said evaporator.

7. The system according to claim 1, wherein said sensor signal is dependent on a difference between a reference temperature and a temperature measured by said temperature sensing element.

8. The system according to claim 1, wherein said superheat vapor quality sensor comprises a sensor body made of a metal material, wherein said heating element and/or said temperature sensing element are arranged embedded within said sensor body in thermal contact therewith.

9. The system according to claim 1, wherein said superheat vapor quality sensor comprises a concave portion, said conduit being partially received within said concave portion.

10. The system according to claim 1, wherein an accumulator is provided between said evaporator and said compressor to accumulate a liquid portion of said ammonia refrigerant, wherein said accumulator is arranged in thermal contact with a conduit arranged between said condenser and said evaporator.

11. The system according to claim 2, wherein said evaporator comprises a plurality of pipes having a first portion exposed to an air flow and a second portion located outside of said air flow, said superheat vapor quality sensor being arranged on said second portion of one of said pipes.

12. The system according to claim 3, wherein said evaporator comprises a plurality of pipes having a first portion exposed to an air flow and a second portion located outside of said air flow, said superheat vapor quality sensor being arranged on said second portion of one of said pipes.

13. The system according to claim 2, wherein said sensor signal is provided based on a reference temperature, said reference temperature being a measure of a temperature of said liquid refrigerant and/or a measure of a pressure at an outlet of said evaporator.

14. The system according to claim 3, wherein said sensor signal is provided based on a reference temperature, said reference temperature being a measure of a temperature of said liquid refrigerant and/or a measure of a pressure at an outlet of said evaporator.

15. The system according to claim 4, wherein said sensor signal is provided based on a reference temperature, said reference temperature being a measure of a temperature of said liquid refrigerant and/or a measure of a pressure at an outlet of said evaporator.

16. The system according to claim 5, wherein said sensor signal is provided based on a reference temperature, said reference temperature being a measure of a temperature of said liquid refrigerant and/or a measure of a pressure at an outlet of said evaporator.

17. The system according to claim 2, wherein said sensor signal is dependent on a difference between a reference temperature and a temperature measured by said temperature sensing element.

18. The system according to claim 3, wherein said sensor signal is dependent on a difference between a reference temperature and a temperature measured by said temperature sensing element.

* * * * *